United States Patent [19]

Collins

[11] 3,920,421

[45] Nov. 18, 1975

[54] REMOVAL OF OXIDES OF NITROGEN FROM GAS STREAMS WHICH ALSO CONTAIN SULFUR DIOXIDE

[75] Inventor: Dwight Dixon Collins, Bakersfield, Calif.

[73] Assignee: Chemsoil Corporation, Bakersfield, Calif.

[22] Filed: Jan. 15, 1974

[21] Appl. No.: 433,546

[52] U.S. Cl. ................................. 55/73; 423/242
[51] Int. Cl.² ........................................ B01D 53/14
[58] Field of Search ............... 55/73, 68, 84, 93, 94, 55/223, 228, 242; 423/212, 242, 235, 512, 519

[56] References Cited
UNITED STATES PATENTS

| | | | |
|---|---|---|---|
| 2,342,704 | 2/1943 | Striplin, Jr. | 423/242 |
| 3,635,657 | 1/1972 | Bressan et al. | 423/235 |
| 3,748,827 | 7/1973 | Bulian et al. | 55/73 |
| 3,764,665 | 10/1973 | Groenendaul et al. | 423/574 |
| 3,836,630 | 9/1974 | Noguchi et al. | 423/242 |

FOREIGN PATENTS OR APPLICATIONS

| | | | |
|---|---|---|---|
| 927,210 | 1963 | United Kingdom | 55/68 |

Primary Examiner—John Adee
Assistant Examiner—Ethel R. Cross
Attorney, Agent, or Firm—Donald D. Mon

[57] ABSTRACT

Method and means for removal of oxides of nitrogen (NOx) from gas streams which also contain sulfur dioxide. Examples of such streams are stack gases from electrical generation plants which use fuels containing sulfur, such as some coals and fuel oils. The invention contemplates the absorption in water of the sulfur dioxide to form sulfurous acid, the addition of a multivalent metal such as iron to the resulting aqueous solution, and the reduction of the nitrogen in the oxides of nitrogen to elemental nitrogen as a consequence of reaction of the oxides of nitrogen with the metal-containing solution.

19 Claims, 6 Drawing Figures

U.S. Patent  Nov. 18, 1975  3,920,421
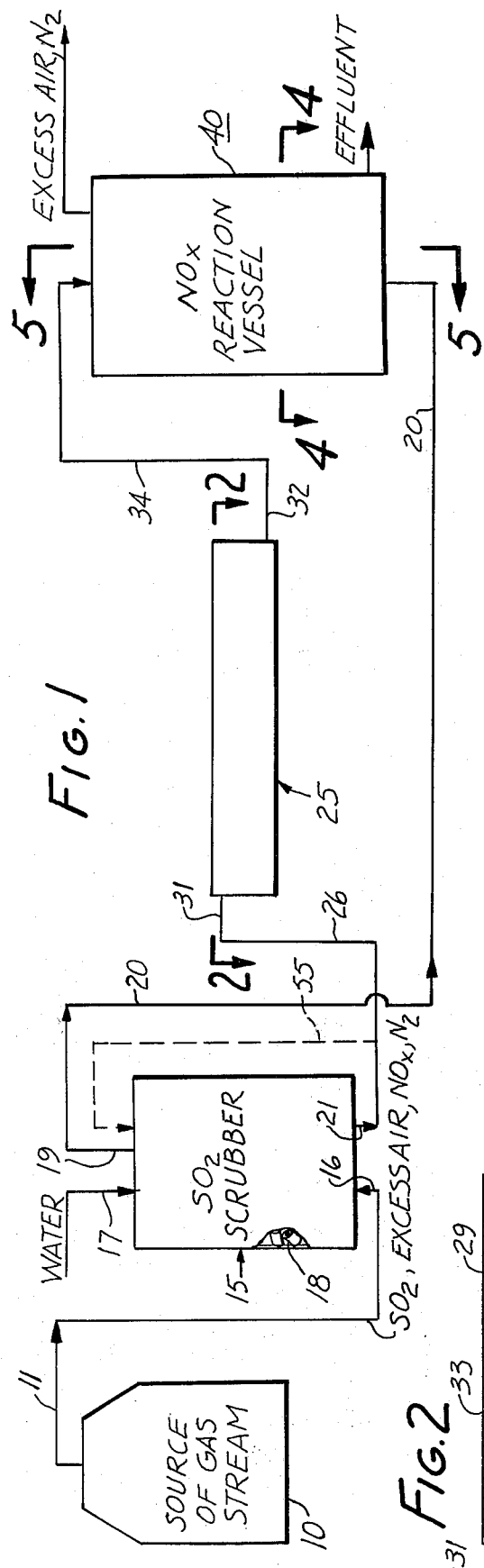
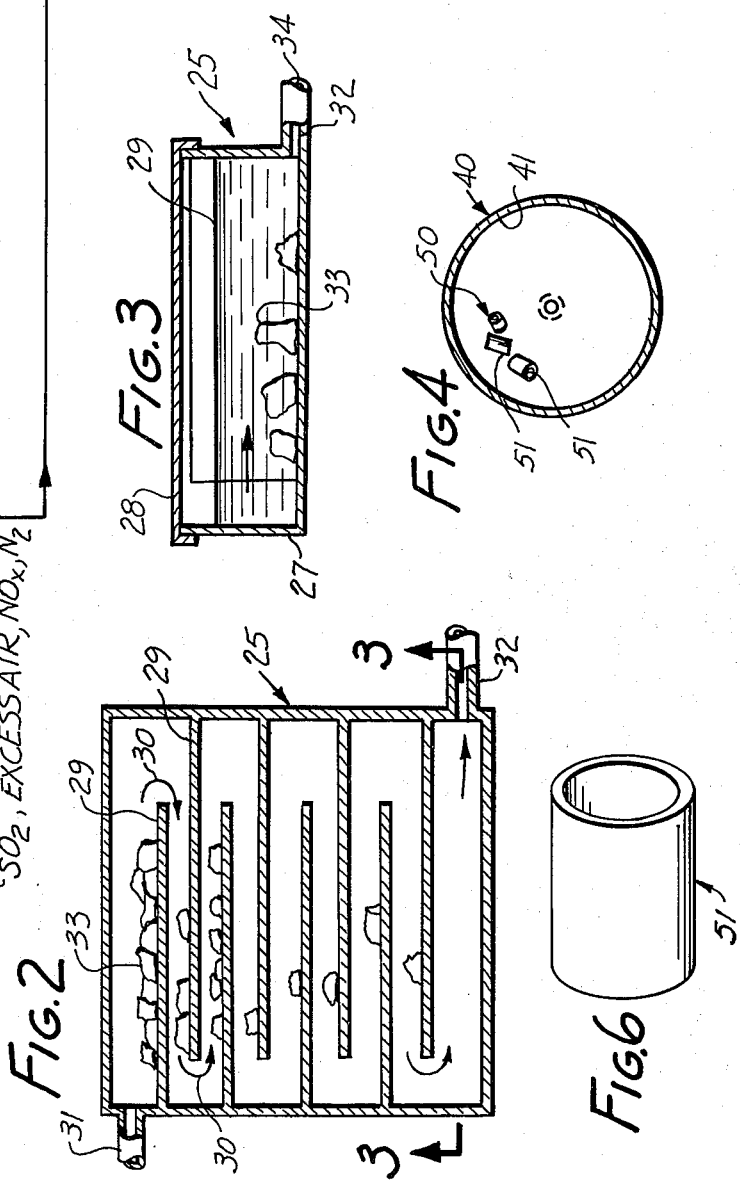
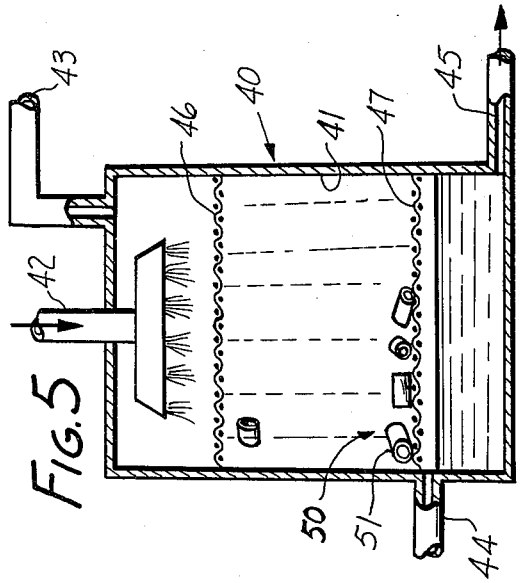
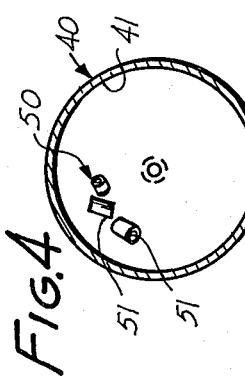
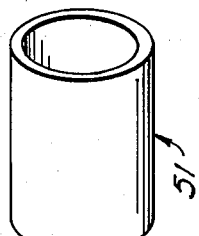

REMOVAL OF OXIDES OF NITROGEN FROM GAS STREAMS WHICH ALSO CONTAIN SULFUR DIOXIDE

This invention relates to the removal of oxides of nitrogen from gas streams which also contain sulfur dioxide.

The discharge of oxides of nitrogen into the atmosphere has become an important ecological concern because they are believed to contribute to the formation of photochemical smog. Limitations on their emission are becoming increasingly stringent.

Also, there has long been an objection to the discharge of sulfur dioxide into the atmosphere. The restrictions on the emission of sulfur dioxide have now become so severe as to prevent the usage of many fuels which are readily available and relatively inexpensive. At a time when fuels in general are in restricted supply, and low sulfur fuels are in especially short supply and are quite costly, a method and means for the removal of sulfur dioxide from their products of combustion is called for. Such means could make the lower quality fuels useful again.

It is an object of this invention to provide method and means whereby both sulfur dioxide and oxides of nitrogen can expeditiously and economically be removed from gas streams which contain both.

This invention contemplates the absorption of sulfur dioxide in water to form sulfurous acid, and as a consequence, depending on the resulting acidity and contents of the water, sulfites and bisulfites. A multi-valent metal (iron being the preferred metal) is added in this solution, and the effluent gas from which the sulfur dioxide was removed is passed through the metal-containing solution at a flow rate and acidity which encourage the reduction of the nitrogen in the oxides of nitrogen present in the gas stream to elemental nitrogen. As a consequence, both the sulfur dioxide and the oxides of nitrogen will be removed from the gas stream.

This invention contemplates the use of a scrubber in which the initial gas stream flows countercurrent through a packing relative to a flow of water, means for adding the multi-valent metal to the solution, and a reaction vessel in which the metal-containing fluid and the effluent gases from the scrubber meet in countercurrent flow through a packing.

The invention will be fully understood from the following detailed description and the accompanying drawings in which:

FIG. 1 is a flow sheet in schematic notation illustrating the invention;

FIg. 2 is a cross-section taken at line 2—2 of FIg. 1, more fully illustrating a desirable feature of construction of part of the system of FIG. 1;

FIg. 3 is a cross-section taken at line 3—3 of FIG. 2;

FIGS. 4 and 5 are cross-sections taken at lines 4—4 and 5—5, in FIG. 1, respectively, showing other desirable features of construction of part of the invention; and FIG. 6 is a perspective view of a packing element suitable for use in the system of FIG. 1.

There is schematically shown in FIG. 1 a source 10 of a gas stream containing both sulfur dioxide and oxides of nitrogen. Such a gas stream might originate with a sulfur-burning tower of the type shown in Mattson U.S. Pat. No. 3,627,134, issued Dec. 14, 1971, entitled "Water Treatment Device", wherein suflur is burned in air in a closed vessel so as to create an effluent gas stream containing sulfur dioxide, excess air, and components of air including oxides of nitrogen resulting from, or left over from, the combustion process. Another and more usual source of such a gas stream is the exhaust stack of electrical generating plants wherein sulfur-bearing fuel oils or coal are burned at relatively high temperatures. Yet another exemplary source of such a gas stream is the exhaust of stationary engines in which relatively high sulfur fuels are combusted. In all of these cases, the gas stream will contain both sulfur dioxide and oxides of nitrogen.

A gas stream from source 10 is conducted by a conduit 11 to a scrubber 15, which can conveniently be formed as a vertically-oriented absorption tower (tank). A gas inlet 16 enters near the bottom of the tower. A supply of water enters at a liquid inlet 17 at the top, and the gas and liquid streams flow countercurrent to each other through a packing 18. The sulfur dioxide is absorbed by the water in the scrubber.

The effluent gases, scrubbed of sulfur dioxide, leave the scrubber through a gas outlet 19 and a second conduit 20. The solution in which the sulfur dioxide was absorbed exits through a solution outlet 21.

A means 25 for the addition of a multi-valent metal to the solution is connected to conduit 26. As best shown in FIg. 2, this means preferably comprises a flat-bottomed tank 27 with a tight-fitting lid 28 and a plurality of staggered baffles 29 which form a serpentine flow path illustrated by arrows 30 from an inlet 31 to an outlet 32. An alternate means is a source of a solution of the multi-valent metal discharging directly into the solution in conduit 26, eliminating the tank entirely.

Ordinarily, however, it will be found most advantageous and economical simply to place pieces 33 of the metal, for example pieces of scrap iron when iron is the selected multi-valent metal, on the bottom of the tank as shown in FIG. 3. The pieces are laid along the serpentine path in the tank, where the acidic solution will gradually dissolve them, and in so doing add the metal (in this case iron) to the solution. The tank itself will be made of metal or plastic which is resistant to the solution.

Whatever the source of metal, the metal-containing solution which flows through conduit 34 is discharged into a reaction vessel 40 which may conveniently have the same construction as the scrubber. Vessel 40 will be described in detail, its details constituting also a description of details of the scrubber 15.

The reaction vessel 40 comprises a vertically-oriented cylindrical tank 41 made of material resistant to the acidic solution, such as resin-reinforced fiberglass. It has a solution inlet 42, a gas vent 43 at its top, a gas inlet 44, and a liquid effluent outlet 45 at its bottom. Inside the tank there are a pair of vertically spaced-apart screens 46, 47 respectively spaced from the top and bottom of tank 41. The screens hold between them a packing 50 comprised of a large number of randomly-oriented packing elements 51 filling the space between the screens. For convenience in illustration, only a few of these packing elements are shown. Any suitable packing element may be utilized in this tank which provides surface area, flow interstices and local conditions favorable to the absorption of sulfur dioxide in the scrubber, or the reaction with oxides of nitrogen in the vessel.

The best presently known example of a packing element is a hollow right circular cylinder made of a material whose surface is not wetted by water, the best known example at the present time being polyvinyl chloride. The packing elements are advantageously about 1¼ inch long, by 1 inch outer diameter, by 1/16 inch wall thickness. For reasons not fully understood, a large number of these elements packed together in random orientation in a tank of this type provides a near optimum recovery of sulfur dioxide in the scrubber and near-optimal completion of reaction in the reaction vessel. Convenient dimensions for the tank are about 2 feet inside diameter by approximately 4 feet high, with a height of packing on the order of about 3 feet. The screens are appropriately perforated to permit the countercurrent flow of both gas and liquid, as well as to support and confine the packing elements as a group. A distributor 52, such as a shower head or other means, discharges liquid over the upper screen.

The flow of the gases and liquids through this system will be evident from the foregoing.

The term "sulfurous acid" is used herein to connote the substance, whatever its actual composition, which is produced by the absorption of sulfur dioxide gas in water by whatever chemical mechanism is involved. The term "absorption" includes a true solution, as well as a reaction in or with water, together with products of ionization such as sulfites and bisulfites in proportions dependent upon the acidity of the resulting solution.

The term "multi-valent metal" as used herein means any metal reactant in the disclosed oxides-of-nitrogen process which has the potential to assume at least two different valences, i.e., a divalent metal which has the potential to go to a trivalent state, or a monovalent metal which has the potential to go to a divalent state. The term is defined to includes mixtures of such metals.

It appears that most metals which are soluble in sufficient concentration to provide the necessary amount of catalyst, and which can assume said plurality of valence levels, are useful as a catalyst for this reaction. These multi-valent metals whose ions are especially useful are defined as the group consisting of the following: iron, copper, cobalt, chromium, nickel, manganese, mercury, tin, titanium, arsenic, lead, and mictures of two or more of these. Certain iron-aluminum compounds are quite useful.

The term "metal-containing solution" means a solution containing one or more of the foregoing metals.

It is theorized that the primary substance produced by injection of sulfur dioxide in water is $H_2SO_3$, which, over a period of time, will react to form $H_2SO_4$ in the presence of oxygen. However, in this process, the various reactions will usually occur prior to the formation of substantial amounts of sulfuric acid, from atmospheric oxygen. The amount of sulfuric acid (sulfate) formed as a consequence of atmospheric oxidation will ordinarily be only that which results from reaction with oxygen which is dissolved in the water.

The term "oxides of nitrogen" is utilized to connote any oxide of nitrogen, of which there are several that are commonly formed in combustion processes. These oxides are readily dissolved in the sulfurous acid solution. No distinction is made between any of them, and the familiar generic formula "NOx" is used to denote any oxide of nitrogen.

The unbalanced overall reactions involved in this invention are as follows:

$H_2O + SO_2 \rightarrow H_2SO_3$
$H_2SO_3 + Fe \rightarrow FeSO_3$ (or to $FeHSO_3$)
$FeSO_3 + NOx \rightarrow FeSO_4 + N_2$
or $FeHSO_3 + NOx \rightarrow FeHSO_4 + N_2$ The catalysis will be described with reference to the two valences of iron. The reaction is analogous in the cases of the other multi-valent metals, so that their reactions will not be individually described. While the precise nature of the reaction is not entirely known, it appears that the probable catalytic reaction is for ferric ion to be reduced to ferrous ion while oxidizing the sulfur in the sulfurous acid from the sulfite to the sulfate. In turn, the resulting ferrous ion appears to be oxidized to ferric ion while reducing the valence of the nitrogen in the oxides of nitrogen. The catalyst thus "swings" or "bridge" between the two ions with which it reacts, assuming first one of its valences and then the other. The overall reaction is that of oxidation of sulfite to sulfate, and the reduction of the nitrogen in the oxides of nitrogen to elemental nitrogen. It is evident that, in order to be certain that all of the oxides of nitrogen have been reduced, there must be sufficient sulfite for the purpose. The sulfite in sulfurous acid is, of course, the primary supply thereof. If the gas stream being worked on has too great a proportion of oxides of nitrogen compared to that of sulfur dioxide, then sulfur dioxide from an external source should be provided as a supplement of make-up. A gas-burning tower as shown in the Mattson patent, or a bottle of sulfur dioxide gas, is a suitable source for the make-up gas.

It is evident that, depending on the concentration of sulfur dioxide in the gas stream, portions of the water stream in the scrubber may be recycled to strengthen the sulfurous acid concentration if desired. A recycling line 55 for this purpose is shown in FIG. 1. This is a convenient means to increase the acidity of the solution in conduit 26.

The water to be used in this system need not be fresh water. In fact, the system is effective with the use of sea water. This is particularly advantageous when the gas stream being scrubbed is located near the ocean, which is the situation in many power plants likely to use high sulfur-burning fuels. The sulfates developed in vessel 40 are acceptable ecologically in such areas.

The pH at which the reaction with NOx proceeds to best advantage is generally in the range between about pH 4.5 and pH 7.3 a region tending to favor the presence of bisulfite and sulfite ions in the solution. It may be a more strongly acid solution if desired, but ordinarily this places more restrictions on the choice of materials of construction than is desirable. The solution may be operated at lesser acidities instead, but then the rates of reaction are slower. The preferred range is also a convenient acidity for dissolving most of the useful multi-valent metals.

It is necessary to provide sufficient sulfur dioxide to react with the dissolved oxygen, if any, in the solution, in addition to providing that which is needed for reaction with the oxides of nitrogen, because the oxygen will react with the sulfurous acid to form sulfate before the oxides of nitrogen will react to form nitrogen. An exemplary solution likely to be encountered in the scrubber contains on the order of 9 parts per million of dissolved oxygen and 20 parts per million of sulfur dioxide.

The amount of iron or other multi-valent metal required in this process is not especially large, and the best concentration can readily be found by a short period of trail and error. The multi-valent metal acts only as a catalyst and is not consumed in the reaction. However, it is more convenient to provide it on a continuous supply basis in a continuous flow operation than to attempt to sequester or otherwise remove it from the ultimate product for re-use.

Tests have been made utilizing approximately 198 cubic feet per minute of stack gases containing on the order of 2000 parts per million of sulfur dioxide. Approximately 5 gallons per minute of water at ambient temperature were required, and iron was used for the multi-valent metal. Substantially complete removal of sulfur dioxide and oxides of nitrogen has been attained with these flow rates.

The process may be carried out at ambient temperatures, and such temperatures are preferred because they favor the absorption of sulfur dioxide and oxides of nitrogen into the solutions.

The pressure losses in this system are relatively small. The pressures found in conventional stack systems are adequate, although blowers may be used if desired. Conventional pumps may be provided to pump the liquid through the system. The scrubber and the reaction vessel are not totally filled with liquid in operation. The passage of liquid through the packing is, instead, a trickling flow, and conditions in the packing are relatively turbulent.

An advantage of this invention is that the passage of the primary stack gases through the scrubber also removes particulate matter from the gas stream. The particulate matter flows through the scrubber and reaction vessel entrained in the liquid, and will not exhaust to the air from the reaction vessel. As a consequence, a gas stream free of particulate matter, sulfur dioxide and oxides of nitrogen is obtained with the use of an elegantly simple device and method.

This invention is not to be limited by the embodiments shown in the drawings and described in the description, which are given by way of example and not of limitation, but only in accordance with the scope of the appended claims.

I claim:

1. A method for removing sulfur dioxide and oxides of nitrogen from a gas stream containing both, comprising the following steps:
   a. contacting the gas stream with water to absorb the sulfur dioxide in the water, thereby to form a sulfurous acid solution;
   b. adding a multi-valent metal selected from the group consisting of iron, copper, cobalt, chromium, nickel, manganese, mercury, tin, titanium, arsenic, lead, mixtures of two or more of these metals, and iron-aluminum compounds, to the sulfurous acid solution to form a metal-containing solution; and
   c. contacting the gas effluent after the absorption of sulfur dioxide with the metal-containing solution to reduce the nitrogen in the oxides of nitrogen to elemental nitrogen.

2. A method according to claim 1 in which the sulfur dioxide is present in quantities in excess of that required to react with and remove all dissolved oxygen in the water.

3. A method according to claim 1 in which the pH of the metal-containing solution is in the range between about pH 4.5 and pH 7.3.

4. A method according to claim 1 in which step (b) is carried out by passing the sulfurous acid solution over a metal-containing body.

5. A method according to claim 4 in which the body is iron.

6. A method according to claim 4 in which the body is scrap iron.

7. A method according to claim 2 in which the pH of the metal-containing solution is in the range between about pH 4.5 and pH 7.3.

8. A method according to claim 7 in which step (b) is carried out by passing the sulfurous acid solution over an iron-containing body.

9. A method according to claim 8 in which the body is scrap iron.

10. A method according to claim 1 in which sulfur dioxide is added in amounts sufficient to assure removal of all dissolved oxygen from the water.

11. A method for removing sulfur dioxide and oxides of nitrogen from a gas stream containing both, comprising the following steps:
   a. contacting the gas stream with water to absorb the sulfur dioxide in the water, thereby to form a sulfurous acid solution;
   b. adding iron to the sulfurous acid solution to form an iron-containing solution; and
   c. contacting the gas effluent after the absorption of sulfur dioxide with the iron-containing solution to reduce the nitrogen in the oxides of nitrogen to elemental nitrogen.

12. A method according to claim 11 in which the pH of the iron-containing solution is in the range between about pH 4.5 and pH 7.3.

13. A method according to claim 11 in which step (b) is carried out by passing the sulfurous acid solution over an iron-containing body.

14. A method according to claim 13 in which the body is scrap iron.

15. A method according to claim 12 in which the pH of the iron-containing solution is in the range between about pH 4.5 and pH 7.3.

16. A method according to claim 15 in which step (b) is carried out by passing the sulfurous acid solution over an iron-containing body.

17. A method according to claim 11 in which sulfur dioxide is added in amounts sufficient to assure removal of all dissolved oxygen from the water.

18. A method according to claim 11 in which the sulfur dioxide is present in quantities in excess of that required to react with and remove all dissolved oxygen in the water.

19. In a method for reducing the nitrogen in oxides of nitrogen to elemental nitrogen by contacting a gas containing said oxides of nitrogen with a solution containing a dissolved metal, said metal having the property to assume a plurality of valence states and which metal is soluble in an aqueous solution of sulfurous acid, a packing for a vessel in which said contact is made, comprising a large number of hollow circularly cylindrical cylinders randomly packed in said vessel, the surface of the cylinders not being wettable by water.

* * * * *